March 18, 1958 V. BERTHELSEN 2,827,552
PLATEN CONSTRUCTION METHOD
Filed April 17, 1957 2 Sheets-Sheet 1

INVENTOR:
VIGGO BERTHELSEN
BY
ATT'YS

March 18, 1958 V. BERTHELSEN 2,827,552
PLATEN CONSTRUCTION METHOD
Filed April 17, 1957 2 Sheets-Sheet 2
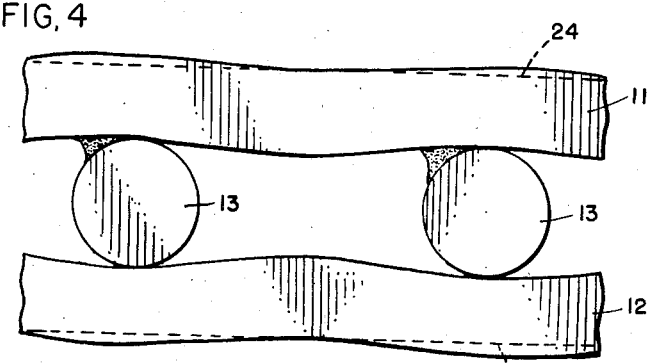
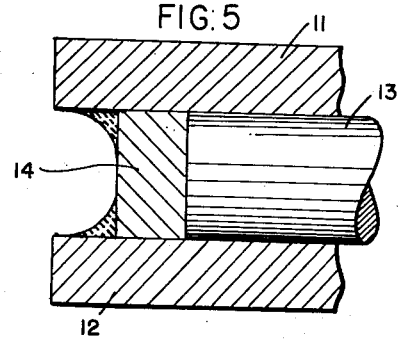
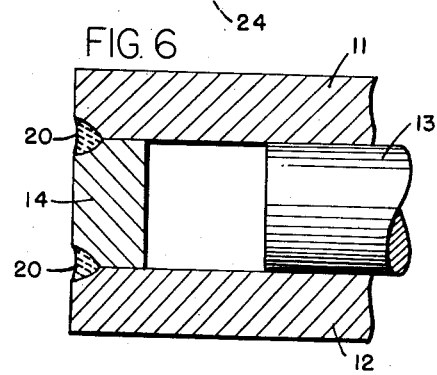
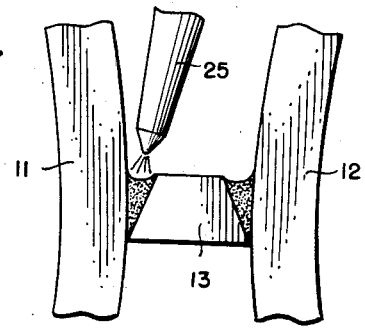
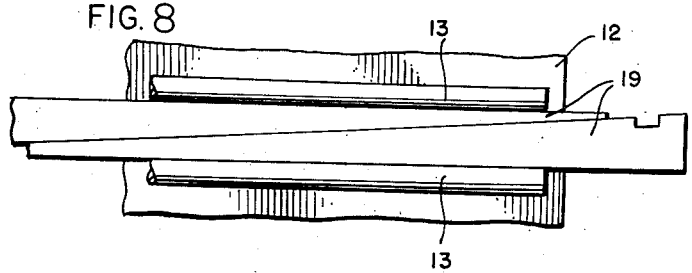
INVENTOR:
VIGGO BERTHELSEN
BY
ATT'YS ns
2,827,552
PLATEN CONSTRUCTION METHOD Viggo Berthelsen, Copenhagen, Denmark, assignor to V. Berthelsen Engineering Works, Inc., Joliet, Ill., a corporation of Illinois Application April 17, 1957, Serial No. 653,351

5 Claims. (Cl. 219—137)

This invention relates to a method of constructing large-size platens required for presses used in the production of adhesively-bonded laminated panels.

Presses for use in the production of adhesively-bonded laminated panels, such as plywood, for example, involve the use of platens which have to be heated and relatively shifted toward and away from each other to achieve predetermined pressures on the superimposed, adhesively-coated, laminations which are to become the finished product. The platens, of course, are metal structures, the larger of which measure up to 12′ x 30′ and, under present methods of construction, may have to be 10 to 12 inches thick. Between opposite faces of such platens there has to be formed a labyrinth for the conduction of a heated fluid to elevate the temperature of the entire face of the platen, and as uniformly as possible. The formation of such a labyrinth is one of the major problems in the current methods of platen construction. When the platen is made of a single piece of material, one method resorted to for forming the labyrinth has been to drill holes longitudinally and transversely between the opposite exposed faces of the platen. This requires considerable skill and hence has proven expensive, when it could be done effectively. If the platens are cast, the labyrinth may be formed by coring the mold. This, too, is an expensive procedure and, at times, uncertain of results as to the precise form and free-flowing condition of the labyrinth. Another practice is the welding of partition strips between top and bottom plates, as set forth in United States Patent No. 2,627,290. This procedure has the disadvantage of producing a rather thick platen, sometimes as much as 12 inches.

The main objects of this invention are to provide an improved method for constructing labyrinthed, flat platens; to provide an improved method of constructing labyrinthed platens for use in hot presses designed for the production of adhesively-bonded laminated panels; to provide an improved method of this kind which makes possible the formation of comparatively shallow platens; and to provide an improved platen-construction method of this kind which is comparatively simple in nature, hence reasonably economical to practice, and resulting in a light-weight, highly rigid, shallow unit.

In the accompanying drawings, wherein the several steps of this improved method of platen construction are diagrammatically illustrated;

Fig. 4 is an enlarged, fragmentary end view of a section of a finished platen structure prior to machining;

Fig. 5 is a similarly enlarged, fragmentary, sectional view showing one manner of closing the space at the ends of the plates;

Fig. 6 is a view similar to Fig. 5 showing a modified manner of closing the space at the ends of the plates;

Fig. 7 is an enlarged, fragmentary, elevational view of a part of the assembly shown in Fig. 3 and illustrating a modified form of partition strip; and Fig. 8 is a diagrammatic illustration of one form of spacing guides used for effecting the successive positioning of the partition strips in predetermined spaced relationship during the strip-welding and plate reformation procedure.

Figure 1:
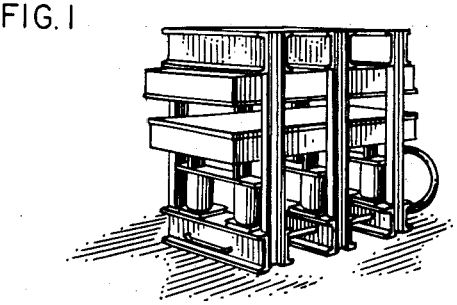
Figure 1 is a perspective view of a plywood-forming press for use with which platens, formed by this improved method, have been especially designed.
Figure 2:
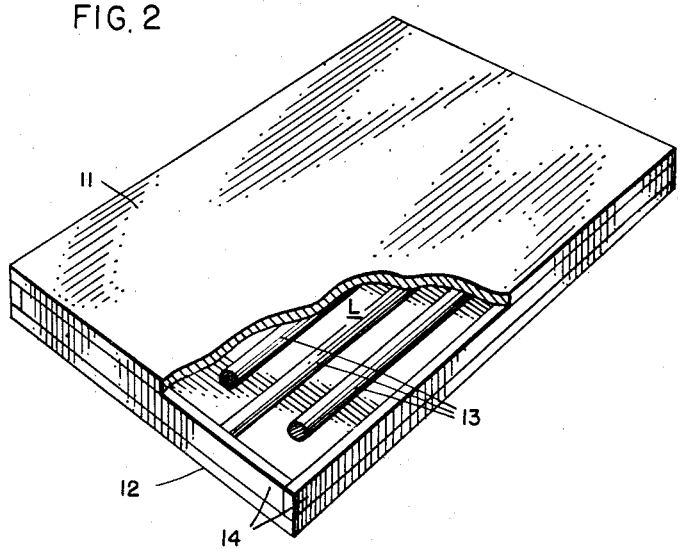
Fig. 2 is a perspective view of a platen constructed in accordance with this improved method, portions of the upper plate being broken away to more clearly show the interior construction.

The essential concept of this invention involves the successive steps of rolling a pair of plates into arcuate form, placing them on edge with their convex faces opposed, successively bonding by mean of arc-welding a series of strips to the opposed plates as the plates are successively pressure straightened into substantially-parallel disposition, and finally machining the opposite outer faces to absolute planar condition.

The material required for carrying out the foregoing concept comprises a pair of plates 11 and 12, a predetermined number of partition strips 13, and side and/or end-closing strips 14. The equipment required for carrying out the foregoing concept comprises a supporting base 16, a pair of pressure-applying elements 17 and 18, spacing guides 19 and the usual welding substance and a welding tool.

The plates 11 and 12 are standard rolled material, generally steel. The dimensions may vary greatly. For some of the smaller hot presses for forming plywood panels the plates may measure 48 inches by 96 inches. For larger presses the plates may range up to 12′ x 30′. The thickness of the plates 11 and 12, of course, will vary with these other-noted dimensions.

The partition strips 13 may be of any desirable cross-sectional form. Two alternate forms are shown in the drawings; circular (Figs. 3–6) and trapezoidal (Fig. 7). Whatever their cross-sectional form, the over-all height of these strips 13 will be comparatively narrow, since this improved method of platen construction was conceived and developed to permit making platens for hot presses of much less thickness than heretofore has been possible by prior methods of platen construction. Where comparatively shallow platens are desired partition strips 13 as narrow as 4 inches may be used in the practice of this method of platen construction.

Figure 3:
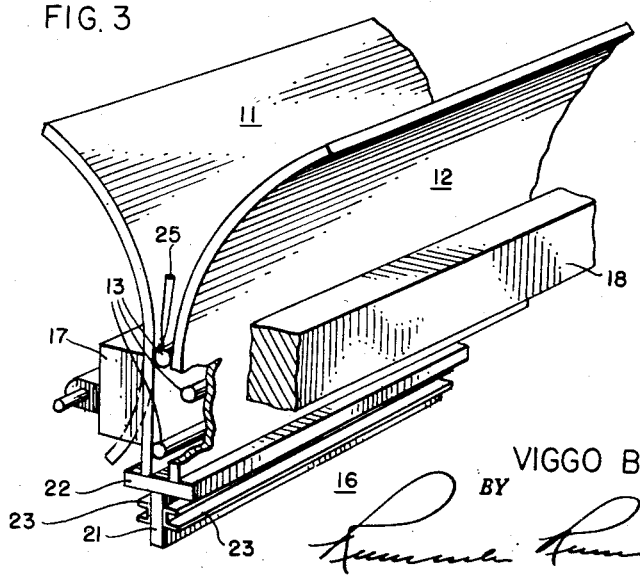
Fig. 3 is a fragmentary perspective showing the several platen parts in position for initiating this improved method of platen construction.

In length, the partition strips 13 are uniform, although less in length than that of the plates 11 and 12. This permits the strips 13 to be staggered longitudinally of each other so that alternate strips 13 have one end spaced inwardly from opposite ends of the plates 11 and 12, as indicated in Fig. 3. It is such alternative positioning of the partition strips 13 that makes for the labyrinth L, extending longitudinally and transversely over the entire faces of the plates 11 and 12.

The strips 14 for closing the space around the perimeters of the partition-bonded plates 11 and 12, generally would be of rectangular cross-section and of a height to permit them to be easily pressed in between the perimetrical portions of the plates 11 and 12 for subsequent bonding thereto.

Two possible arrangements of these closing strips 14 are shown in Figs. 5 and 6, respectively. The one shows the strips 14 set in from the edges of the plates 11 and 12; the other shows the strips flush with the edges of the plates. However, in this adaptation the respective outer corners of the strips 14 and the plates 11 and 12 are beveled to form pockets 20 for the reception of the bonding substance.

The supporting base 16 for carrying out this method of platen construction may be of any suitable form and mounting found to be most convenient and practical for attaining the best results. Here, this supporting base is shown comprised of a pair of members 21 and 22 arranged in the form of a T with the stem member 21 secured to supports 23 and the transverse member 22 disposed for supporting the plates 11 and 12, as will be explained presently. This support base 16 might be a piece of conventional T-iron.

The pressure-applying elements 17 and 18 may be of a form and an arrangement most suitable for carrying out the herein described method of platen construction. The essential factor is that the elements be arranged for relative movement transversely of the plates 11 and 12 and for step by step successive advance parallel to the plane into which the plates 11 and 12 will ultimately be disposed by the practice of this method. The pressure source for either or both movements of the elements 17 and 18 obviously may be either hydraulic or mechanical.

The spacing guides 19 here are shown as a pair of opposed wedges adapted to be set on edge one on the other so as to dispose their opposite faces parallel and permit varying the distance between such faces by relative adjustment of the two parts. A pair of these spacing guides 19 are set on a previously-welded strip 13 so that the next strip 13 will be positioned at a predetermined distance and held in place pending the reformation of the adjacent portion of the plates 11 and 12 and the welding of the strip to these plates.

The primary steps in the practice of this improved method of platen construction, employing the foregoing materials and equipment, are as follows:

*First step.*—By suitable means, such as a rolling mill, the arcuation of normally-flat plates 11 and 12 is effected. The degree of arcuation most likely will be influenced by the size of the plates 11 and 12. It should be such as best will afford two advantages, (1) as open a space between the convex faces as possible for the positioning of the partition strips 13 and the entrance of the bonding tool and (2) make as facile as possible the subsequent step by step reformation of the plates 11 and 12 to the requisite parallel relationship.

*Second step.*—With the supporting base 16 and the pressure-applying elements 17 and 18 arranged substantially as shown in Fig. 3, the two plates 11 and 12, with their convex faces opposed, are set on edge on the supporting base 16 between the pressure-applying elements 17 and 18. The spacing of the plates at the edges in contact with the supporting base member 22 would be precisely that of the height of the partition strips 13 to be welded in between the reformed plates.

When desired, one of these partition strips 13 could be placed centrally along the transverse member 22. In some instances such a strip might be fixed to the support member 22 and thus become a permanent part of the supporting base 16. Or, it might be the first partition strip 13 bonded along the perimeter of the juxtaposed plates 11 and 12. In either case, it would become the support whereon would be placed the spacing guides 19, for determining the positioning of the first or next partition strip 13.

With the first-to-be-bonded partition strip 13 in place, the conventional welding or bonding substance would be applied along the top of the strip 13 and the bonding tool—indicated at 25 in Figs. 3 and 7—inserted, so that the strip 13 may be welded to the opposed faces of the plates 11 and 12.

The first partition strip 13 being secured in place, the spacing guides 19 are withdrawn and replaced to rest on the presently-bonded strip 13. The next partition strip 13 is then set on these spacing guides 19.

*Third step.*—The appropriate movement of the pressure-applying elements 17 and 18 is then effected and the portions of the plates 11 and 12 above the previously-welded partition strip 13 is reformed to bring them into substantially parallel disposition. Thereupon the last-placed partition strip 13 is welded in place, as above noted.

The successive removal and repositioning of the spacing guides 19 and the bonding of the partition strips 13 to the plates after each pressure-applying action, continues until all the required partition strips 13 are bonded in place and the plates 11 and 12 have been reformed to dispose them in parallel relationship.

It is not expected that the reforming process will restore the plates 11 and 12 to a perfectly flat and parallel relationship throughout their entire areas. More than likely there will be depressions remaining between the several partition strips 13, as has been indicated in Fig. 4.

*Fourth step.*—Therefore, it becomes necessary to machine the opposite exposed faces of the plates 11 and 12 so as to remove the high portions adjacent the bonded strips 13 and bring about an absolute planar condition of both of these exposed faces of the plates 11 and 12. The probable plane of such machining operation is indicated by the dotted lines 24 of Fig. 4.

*Fifth and final step.*—The final procedure required is the closing of the space between the plates 11 and 12 at their ends; also along their edges, if the first partition strip 13 was set inwardly from the edges of these plates.

In either event it may first be necessary to machine the opposed inner faces of the plates 11 and 12 inwardly along the perimeters to reduce these opposed faces to absolute planar condition so that the insertion of the closing strips 14 will seal off the perimetrical areas and make for a fluid tight labyrinth "L."

The drawings show the closing strips 14 may be set in from the respective edges of the plates 11 and 12 (Fig. 5) or disposed flush with edges of the plates 11 and 12 (Fig. 6).

Although but one specific embodiment of this invention is herein shown and described, it will be understood that numerous details of the construction shown may be altered or omitted without departing from the spirit of the invention as defined by the following claims.

I claim:

1. The improved method of constructing a labyrinthed platen which comprises effecting the arcuation of a pair of plates which are to constitute the parallelly-disposed top and bottom portions of the finished platen, disposing the arcuate plates on edge with the convex faces opposed and at the edges predeterminedly spaced apart, successively inserting partition strips of predetermined height and of less length than the plates between the opposed faces of the arcuate plates with alternate strips staggered, and in turn arc-welding each partition strip to the plates along the lateral edges of the strip, and successively applying requisite pressures to the concave faces of the plates between successively-positioned and arc-welded partition strips to reform the intermediate portions of the plates into substantially parallel relationship.

2. The improved method of constructing a labyrinthed platen which comprises effecting the arcuation of a pair of plates which are to constitute the parallelly-disposed top and bottom portions of the finished platen, disposing the arcuate plates on edge with the convex faces opposed and at the edges predeterminedly spaced apart, successively inserting partition strips of predetermined height and of less length than the plates between the opposed faces of the arcuate plates with alternate strips staggered, and in turn arc-welding each partition strip to the plates along the lateral edges of the strip, and successively applying requisite pressures to the concave faces of the plates between successively-positioned and arc-welded partition strips to reform the intermediate portions of the plates into substantially parallel relationship, and finally machining the oppositely-exposed faces of the plates to absolute planar condition.

3. The improved method of constructing a labyrinthed platen which comprises effecting the arcuation of a pair of plates which are to constitute the parallelly-disposed top and bottom portions of the finished platen, disposing the arcuate plates on edge with the convex faces opposed and at the edges predeterminedly spaced apart, successively inserting partition strips of predetermined height and equal length less than the length of the plates between the opposed faces of the arcuate plates with successive strips staggered so that alternate strips have one end of each spaced inwardly from the opposite transverse ends of the superimposed plates and in turn arc-welding each partition strip to the plates along the lateral edges of the strip, and successively applying requisite pressures to the concave faces of the plates between successively-positioned and arc-welded partition strips to reform the intermediate portions of the plates into substantially parallel relationship, and subsequently positioning and arc-welding in place perimetrical partition strips to close the space along the sides and ends of the superimposed plates.

4. The improved method of constructing a labyrinthed platen which comprises effecting the arcuation of a pair of plates which are to constitute the parallelly-disposed top and bottom portions of the finished platen, disposing the arcuate plates on edge with the convex faces opposed and at the edges predeterminedly spaced apart, successively inserting partition strips of predetermined height and equal lengths less than the length of the plates between the opposed faces of the arcuate plates with successive strips staggered so the alternate strips have one end of each spaced inwardly from the opposite transverse ends of the superimposed plates and in turn arc-welding each partition strip to the plates along the lateral edges of the strip, and successively applying requisite pressures to the concave faces of the plates between successively-positioned and arc-welded partition strips to reform the intermediate portions of the plates into substantially parallel relationship, subsequently positioning and arc-welding in place perimetrical partition strips to close the space along the sides and ends of the superimposed plates, and finally machining the opposite exposed faces of the plates to absolute planar condition.

5. The improved method of constructing a labyrinthed platen which comprises effecting the arcuation of a pair of plates which are to constitute the parallelly-disposed top and bottom portions of the finished platen, disposing the arcuate plates on edge with the convex faces opposed and at the edges predeterminedly spaced apart, positioning a pair of relatively-movable pressure-applying elements to contact the convex faces of the plates and be successively moved parallel to the plane into which the plates finally are to be reformed, successively inserting partition strips of predetermined height and of less length than the plates between the opposed faces of the arcuate plates with alternate strips staggered, and in turn arc-welding each partition strip to the plates along the lateral edges of the strip, and successively effecting the actuation of the pressure-applying elements for applying requisite pressures to the concave faces of the plates between successively-positioned and arc-welded partition strips to reform the intermediate portions of the plates into substantially parallel relationship.

References Cited in the file of this patent

UNITED STATES PATENTS 2,627,290     Berthelsen _____ Feb. 3, 1953